United States Patent
Athley et al.

(10) Patent No.: US 10,484,061 B2
(45) Date of Patent: Nov. 19, 2019

(54) ENHANCED TRANSMIT POINT (TRP) BEAM GROUPING BASED ON UE BEAMS

(71) Applicant: TELEFONAKTIEBOLAGET LM ERICSSON (PUBL), Stockholm (SE)

(72) Inventors: Fredrik Athley, Kullavik (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 26 days.

(21) Appl. No.: 15/743,057

(22) PCT Filed: Dec. 4, 2017

(86) PCT No.: PCT/EP2017/081395
§ 371 (c)(1),
(2) Date: Jan. 9, 2018

(87) PCT Pub. No.: WO2018/127335
PCT Pub. Date: Jul. 12, 2018

(65) Prior Publication Data
US 2019/0081673 A1     Mar. 14, 2019

Related U.S. Application Data

(60) Provisional application No. 62/442,540, filed on Jan. 5, 2017.

(51) Int. Cl.
*H04B 7/06* (2006.01)
*H04B 7/08* (2006.01)

(52) U.S. Cl.
CPC .......... *H04B 7/0617* (2013.01); *H04B 7/063* (2013.01); *H04B 7/0695* (2013.01); *H04B 7/088* (2013.01)

(58) Field of Classification Search
CPC ... H04B 7/0617; H04B 7/0642; H04B 7/0691
See application file for complete search history.

(56) References Cited

U.S. PATENT DOCUMENTS

| | | |
|---|---|---|
| 2014/0198681 A1 | 7/2014 | Jung et al. |
| 2015/0282122 A1 | 10/2015 | Kim |

(Continued)

FOREIGN PATENT DOCUMENTS

WO   2016/010685 A1   1/2016

OTHER PUBLICATIONS

International Search Report and Written Opinion issued in International Application No. PCT/EP2017/081395, dated Feb. 12, 2018, 19 pages.

*Primary Examiner* — Kevin Kim
(74) *Attorney, Agent, or Firm* — Rothwell, Figg, Ernst & Manbeck, p.c.

(57) ABSTRACT

A group TRP beams for a given UE beam is formed by adding to the group of TRP beams any TRP beam for which the path gain meets a threshold. That is, grouping TRP beams that have "good enough" path gain to a certain UE beam in the same group. An advantage of forming a group TRP beams for a given UE beam by including in the TRP beam group any TRP beam for which the path gain meets a threshold is that, in many scenarios, there is a greater probability that there will be more usable TRP beams included in the group. This feature can be useful during multi-user scheduling at the TRP.

18 Claims, 11 Drawing Sheets

(56) References Cited

U.S. PATENT DOCUMENTS

2018/0048375 A1* 2/2018 Guo .................... H04B 7/088
2018/0132217 A1* 5/2018 Stirling-Gallacher .................... H04B 7/0417

* cited by examiner

ENHANCED TRANSMIT POINT (TRP) BEAM GROUPING BASED ON UE BEAMS

CROSS REFERENCE TO RELATED APPLICATION(S)

This application is a 35 U.S.C. § 371 National Stage of International Patent Application No. PCT/EP2017/081395, filed Dec. 4, 2017, designating the United States and claiming priority to U.S. provisional application No. 62/442,540, filed on Jan. 5, 2017. The above identified applications are incorporated by reference.

TECHNICAL FIELD

Disclosed are embodiments for enhanced transmit point (TRP) beam grouping based on UE beams.

BACKGROUND

1.0 Introduction

The Third Generation Partnership Project (3GPP) has begun on work on the development and design of the next generation mobile communications system (a.k.a., as the 5G mobile communication system or simply "5G" for short). 5G will encompass an evolution of today's 4G networks and the addition of a new, globally standardized radio access technology known as "New Radio" (NR).

The large variety of requirements for NR implies that frequency bands at many different carrier frequencies will be needed. For example, low frequency bands will be needed to achieve sufficient coverage and higher frequency bands (e.g. mmW, such as near and above 30 GHz) will be needed to reach the required capacity. At high frequencies the propagation properties are more challenging and high order beamforming at the base station (e.g., eNB or gNB) will be required to reach sufficient link budget. For example, narrow beam transmission and reception schemes may be needed at higher frequencies to compensate the high propagation loss. For a given communication link, a beam can be applied at the transmission point (TRP) (such a beam is referred to herein as "a TRP beam") and a beam can be applied at a User Equipment (UE) (i.e., fixed or mobile wireless communication devices (WCDs)) (such a beam is referred to herein as "a UE beam")), which collectively is referred to as a "beam pair link" (BPL) or just "link" for short.

NR will have a beam centric design, which means that the traditional cell concept is relaxed and UEs will in many cases be connected to and perform "handover" between narrow beams instead of cells. Hence, 3GPP has agreed to study concepts for handling mobility between beams (both within and between transmission points (TRPs)). As used herein, a TRP is a base station or a component of a base station. At higher frequencies, where high-gain beamforming will be needed, each beam will be useful only within a small area (i.e., the beam's coverage area) and the link budget outside the coverage area will deteriorate quickly. Hence, a frequent and fast beam switching method is needed to maintain high performance.

1.1 Beamforming

Beamforming implies transmitting the same signal from multiple antenna elements of an antenna array with an amplitude and/or phase shift applied to the signal for each antenna elements. These amplitude/phase shifts are commonly denoted as the antenna weights and the collection of the antenna weights for each of the antennas is a precoding vector.

Different precoding vector give rise to a beamforming of the transmitted signal and the weights can be controlled so that the signals are coherently combining in a certain angle direction as seen from the antenna array in which case it is the that a beam is formed in that direction. If the antennas of the array are placed in two dimensions, i.e. in a plane, then the beam can be steered in both azimuth and elevation directions with respect to the plane perpendicular to the antenna array.

SUMMARY

The concept of per-UE TRP beam grouping has recently started to be discussed in 3GPP. One proposal involves, for each UE, grouping TRP beams (e.g., TRP transmit (TX) beams or TRP receive (RX) beams) based on the best UE beam (e.g., UE RX beam or UE TX beam), such that, for example, all the TRP beams that have UE beam 1 as best UE beam is grouped in group 1, all TRP beams that have UE beam 2 as best UE beam is grouped in group 2, etc. The benefit of such grouping is that the TRP will have knowledge as to the set of TRP beams that can be used for a given UE beam. Accordingly, when a TRP is configured to use a first TRP beam to transmit data to a UE that is using a given UE beam and the TRP would like to switch to another TRP beam, then the TRP knows which TRP beams to which it can switch (i.e., which TRP beams work well with the given UE beam) without any need of signaling the switch to the UE. Hence overhead signaling is reduced.

As a specific example, assume for a given TRP and given UE that each of TRP beam 1 and TRP beam 2 has the same best UE beam (e.g., UE beam 1). In this case the TRP can switch between TRP beam 1 and TRP beam 2 without the UE having to switch to a different UE beam (e.g., UE beam 2) because both TRP beam 1 and TRP beam 2 work well with the same UE beam. Hence there is no need for the TRP to signal to the UE when the TRP switches between TRP beam 1 and TRP beam 2.

A problem with grouping the TRP beams based on their best UE beam is that, for any given UE beam, it is possible the set of TRP beams that are grouped for the UE beam is a small set (or even an empty set). An alternative way to form a group TRP beams for a given UE beam is to add to the group of TRP beams for the UE beam any TRP beam for which the path gain meets a threshold. That is, grouping TRP beams that have "good enough" path gain to a certain UE beam in the same group.

An advantage of forming a group TRP beams for a given UE beam by including in the TRP beam group any TRP beam for which the path gain meets a threshold is that, in many scenarios, there is a greater probability that there will be more usable TRP beams included in the group. This feature can be useful during multi-user scheduling at the TRP. One example of a use case is when multiple UEs would benefit from being frequency multiplexed within the same TRP beam (e.g., TRP TX beam). In this case, it would be beneficial if the TRP knows as many TRP beams that can be used for a respective UE beam (e.g. UE RX beam) in order to increase the possibility to co-schedule the users in the same beam (but on different frequencies).

Accordingly, in one aspect there is provided a method for forming at least i) a first of group of TRP beams for use in communicating with a UE when the UE is employing a first UE beam and ii) a second group of TRP beams for use in communicating with the UE when the UE is employing a second UE beam. The method includes: obtaining a received signal power threshold value, T; obtaining a first parameter indicating a received signal strength of a reference signal transmitted by a TRP over a first TRP beam and received by the UE using the first UE beam; determining whether the first parameter is not less than T; and as a result of determining that the first parameter is not less than T, adding the first TRP beam to the first group of TRP beams. The method also includes obtaining a second parameter indicating a received signal strength of a reference signal transmitted by the TRP over the first TRP beam and received by the UE using the second UE beam; determining whether the second parameter is not less than T; and as a result of determining that the second parameter is not less than T, adding the first TRP beam to the second group of TRP beams such that the first TRP beam is included in both the first group of TRP beams and the second group of TRP beams.

In some embodiments, obtaining the received signal power threshold value comprises receiving a message transmitted by the TRP, wherein the message comprises the received signal power threshold value.

In some embodiments, the method further comprises the UE receiving the reference signal, and obtaining the first parameter indicating the received signal strength of the reference signal comprises the UE detecting the signal strength of the received reference signal.

In some embodiments, the method is performed by the first UE, and the method further comprises the UE transmitting to the TRP beam grouping information comprising information indicating that the first TRP beam is included in the first group of TRP beams and information indicating that the first TRP beam is included in the second group of TRP beams.

In some embodiments the method further includes: the TRP receiving beam grouping information transmitted by the UE, wherein the beam grouping information comprises information indicating that the first TRP beam is included in the first group of TRP beams and information indicating that the first TRP beam is included in the second group of TRP beams, and the TRP making a data transmission scheduling decision for the UE using the received beam grouping information. In some embodiments, making the data transmission scheduling decision for the UE using the received beam grouping information comprises determining whether to schedule a data transmission to the UE, wherein the determination is based on whether the beam grouping information indicates that a second TRP beam is included in the first group of TRP beams.

In another aspect there is proved an apparatus (e.g., TRP, UE, etc.) adapted to perform the above described method.

In another aspect there is provided a method for scheduling a data transmission to a first UE. The method includes: a TRP receiving first beam grouping information transmitted by the first UE, the first beam grouping information comprising: a) information indicating that a first transmit point, TRP, beam is included in a first group of TRP beams for use in communicating with the first UE when the first UE is employing a first UE beam and b) information indicating that the first TRP beam is included in a second group of TRP beams for use in communicating with the first UE when the first UE is employing a second UE beam. The method further includes and the TRP making a data transmission scheduling decision for the first UE using the received first beam grouping information.

In some embodiments the method also includes the TRP determining that the first UE is configured such that the first UE employs the first UE beam during a first time slot, wherein making the data transmission scheduling decision for the first UE using the first beam grouping information comprises determining whether to schedule a data transmission to the first UE during the first time slot, wherein the determination is based on whether the first beam grouping information indicates that a second TRP beam is included in the first group of TRP beams for use in communicating with the first UE when the first UE is employing the first UE beam.

In some embodiments the method also includes the TRP receiving second beam grouping information transmitted by a second UE, the second beam grouping information comprising information indicating that the second TRP beam is included in a third group of TRP beams for use in communicating with the second UE when the second UE is employing a third UE beam; the TRP determining that the second UE is configured such that the second UE employs the third UE beam during the first time slot; and the TRP selecting the second TRP beam for use in transmitting data to the second UE during the first time slot, wherein the TRP makes the data transmission scheduling decision for the first UE after selecting to use the second TRP beam to transmit the data to the second UE.

In some embodiments the method also includes: the TRP scheduling a transmission of data to a third UE over a third TRP beam during a second time slot; the TRP determining that the first UE is configured such that the first UE employs the second UE beam during the second time slot; and the TRP making a second data transmission scheduling decision for the first UE using the first beam grouping information. Making the second data transmission scheduling decision for the first UE using the first beam grouping information comprises determining whether to schedule a data transmission to the first UE during the second time slot, wherein the determination is based on whether the first beam grouping information indicates that the third TRP beam is included in the second group of TRP beams for use in communicating with the first UE when the first UE is employing the second UE beam.

In another aspect there is proved an apparatus (e.g., TRP) adapted to perform the above described method.

BRIEF DESCRIPTION OF THE DRAWINGS

The accompanying drawings, which are incorporated herein and form part of the specification, illustrate various embodiments.

DETAILED DESCRIPTION

As mentioned above, narrow beam transmission and reception schemes will be needed at higher frequencies to compensate the high propagation loss. For a given communication link, a beam can be applied at both a TRP 106 (see FIG. 1) and a first UE 102, which will be referred to as a beam pair link (BPL). The task of the beam management procedure is to discover and maintain beam pair links.

Figure 1:
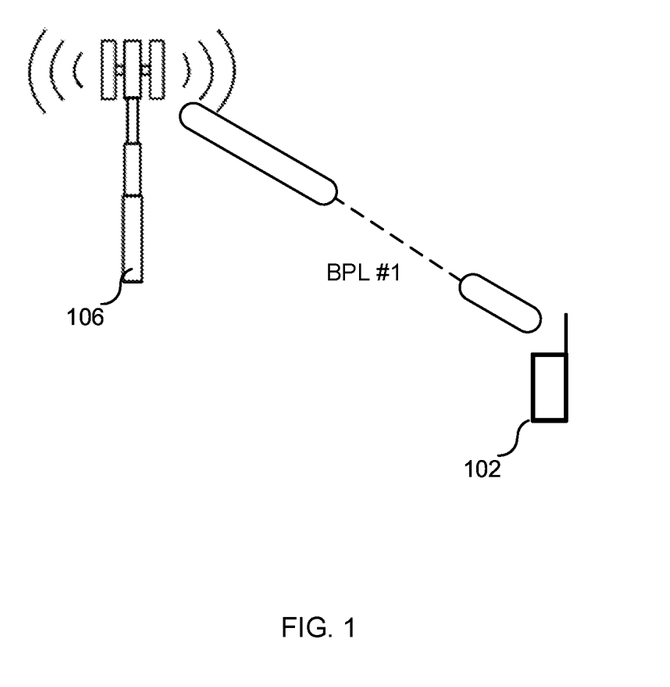
FIG. 1. illustrates a beam pair link.

In the example shown in FIG. 1, one BPL has been discovered and is being maintained by the network. A BPL (i.e., the combination of a TRP beam and a UE beam) is expected to be discovered and monitored by the network using measurements on downlink reference signals (RSs) used for beam management (e.g., a Channel State Information RS (CSI-RS) (CSI-RS has been agreed in 3GPP as beam reference signal for New Radio (NR)). A CSI-RS for beam management can be transmitted periodically, semi-persistently or aperiodically (e.g., event triggered) and it can be either shared between multiple UEs or be UE-specific. In order to find a suitable TRP TX beam TRP 106 transmits CSI-RS in different TRP TX beams on which UE 102 performs power measurements (e.g., Reference Signal Received Power (RSRP) measurements) and reports back the N best TRP beams (where N can be configured by the network). Furthermore, the CSI-RS transmission on a given TRP beam can be repeated to allow UE 102 to evaluate suitable UE RX beams. In case of reciprocity, the BPL found from DL reference signals can be applied for both DL and UL data transmission.

Conventionally, there are three different beamforming implementations, both at TRP 106 and at UE 102: 1) analog beamforming, 2) digital beamforming and 3) hybrid beamforming. Each beamforming implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming.

Figure 2A:
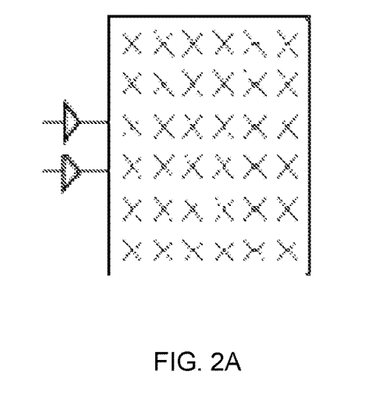
FIG. 2A illustrates an example two-dimensional panel.
Figure 2B:
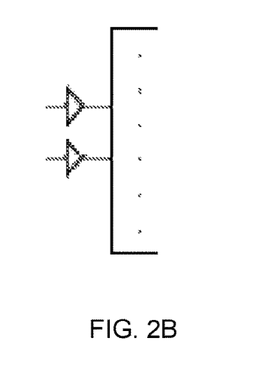
FIG. 2B illustrates an example one-dimensional panels

One type of beamforming antenna architecture that has been agreed to study in 3GPP for the NR access technology is the concept of antenna panels, both at TRP 106 and at UE 102. A panel is an antenna array of dual-polarized elements with typically one transmit/receive unit (TXRU) per polarization. An analog distribution network with phase shifters is used to steer the beam of each panel. FIG. 2A illustrates an example two-dimensional panel and FIG. 2B illustrates an example one-dimensional panel, where each panel is connected to one TXRU per polarization. It is expected that the phase and amplitude is known for each element within an analog array (e.g.) for both TX and RX, i.e. the array can be assumed to be calibrated. Hence, reciprocity can be used to find a good UE beam in case a good TRP beam has been found, and vice versa.

As discussed in the Summary section, for at least one UE served by TRP 106 (e.g., UE 102), it is advantageous for TRP 106 to obtain information identifying, for each available UE beam, the set of TRP beams that work well with the UE beam.

Figure 3:
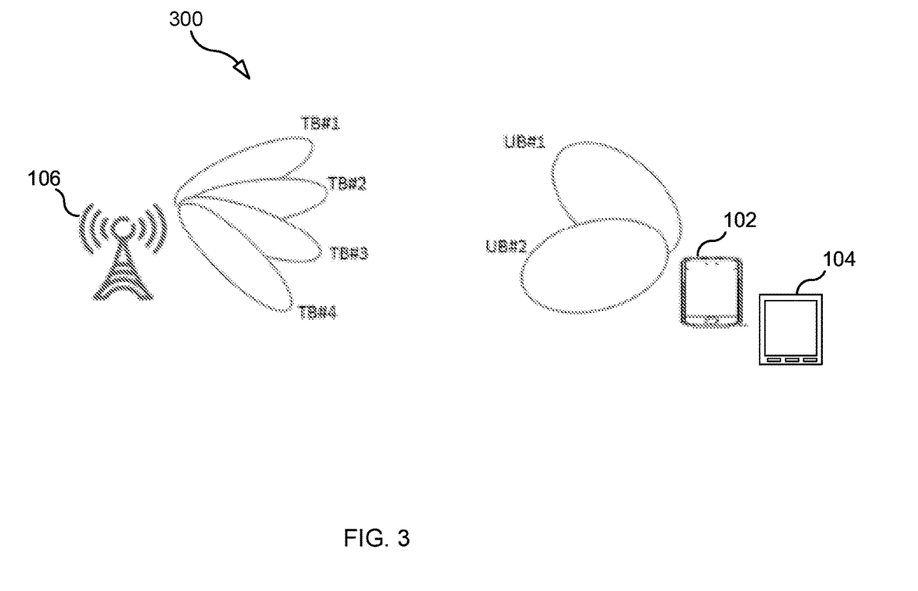
FIG. 3 illustrates an example TRP employing four TRP beams.
Figure 4:
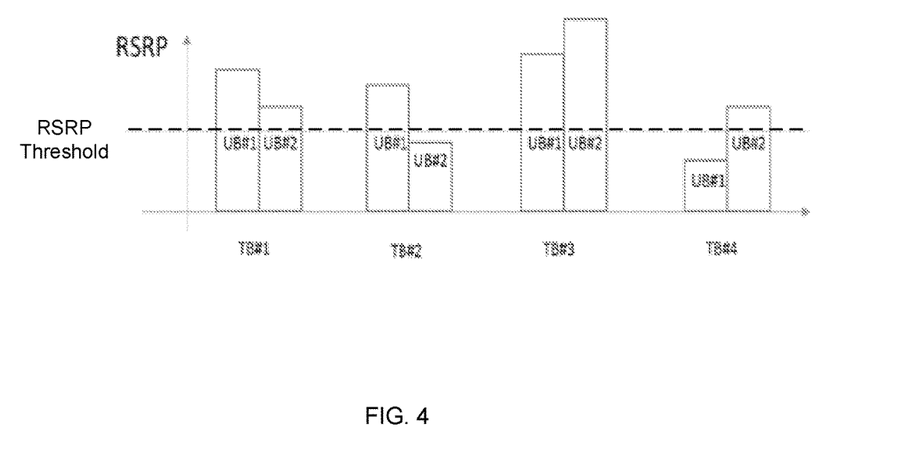
FIG. 4 is a flow chart illustrating a process according to one embodiment.

FIG. 3 illustrates an example scenario. In the example scenario, TRP 106 has four different TRP beams (TB#1, TB#2, TB#3, TB#4) and UE 102 has two UE beams (UB#1 and UB#2). FIG. 4 is graph 400 showing, for each different TRP beam, a first RSRP measured by UE 102 when UE 102 employed beam UB#1 and a second RSRP measured by UE 102 when UE 102 employed beam UB#2. Using the information provided in graph 400, one may intelligently form a first group of TRP beams for use with beam UB#1 and a second group of TRP beams for use with beam UB#2.

For example, forming the two TRP beam groups using the "best TRP beam" methodology will result in: a) the first group of TRP beams consisting of beams TB#1 and TB#2, and b) the second group of TRP beams consisting of beams TB#3 and TB#4. That is, in the "best TRP beam" approach, a TRP beam that is used to transmit an RS is added to the first set of TRP beams if the RSRP measured by UE 102 while UE 102 was employing beam UB#1 to receive the RS is greater than the RSRP measured by UE 102 while UE 102 was employing beam UB#2 to receive the RS, otherwise the TRP beam is added to the second set of TRP beams.

In contrast, forming the TRP beam groups using the "good enough TRP beam" methodology will result in: a) the first group of TRP beams consisting of beams TB#1, TB#2 and TB#3, and b) the second group of TRP beams consisting of beams TB#1, TB#3 and TB#4. That is, in the "good enough TRP beam" approach, a TRP beam that is used to transmit an RS is added to the first set of TRP beams if the RSRP measured by UE 102 while UE 102 was employing beam UB#1 to receive the RS is greater than a predetermined threshold (denoted "RSRP Threshold" in FIG. 4), and the TRP beam is also added to the second set of TRP beams if the RSRP measured by UE 102 while UE 102 was employing beam UB#2 to receive the RS is greater than the threshold.

The RSRP Threshold defines a minimum acceptable link budget for a beam pair link between TRP 106 and UE 102. If a beam pair link has an RSRP above the threshold, the beam pair link is assumed to have sufficient signal strength to be used for data transmission. As the above indicates, the "good enough TRP beam" strategy works better than the "best TRP beam" strategy as the "good enough TRP beam" strategy can lead to larger TRP beam groups, thereby providing more TRP beams for TRP 106 to choose from when performing scheduling for upcoming data transmissions for UE 102s TRP 106 is serving.

Figure 5:
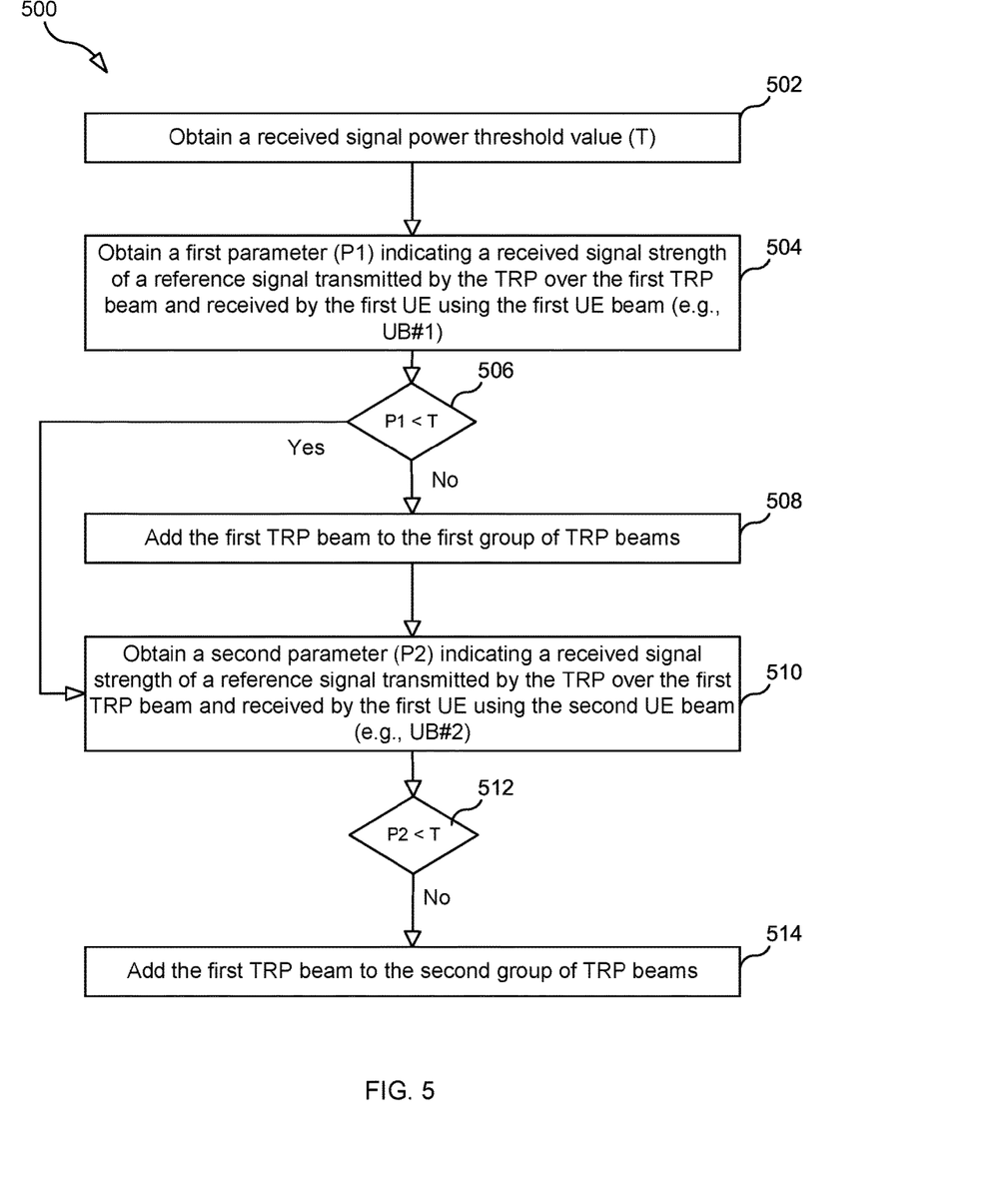
FIG. 5 is a flow chart illustrating a process according to one embodiment.

FIG. 5 is a flow chart illustrating, according to some embodiments, a process 500 for forming at least i) a first of group of TRP beams for use in communicating with a UE (e.g., UE 102) when the UE is employing a first UE beam (e.g., UB#1) and ii) a second group of TRP beams for use in communicating with the UE when the UE is employing a second UE beam (e.g., UB#2).

Process 500 may begin with step 502, in which a received signal power threshold value (T) is obtained. In some embodiments, obtaining the received signal power threshold value comprises receiving a message transmitted by the TRP, wherein the message comprises the received signal power threshold value.

In step 504, a first parameter indicating a received signal strength of a reference signal transmitted by TRP 106 over a first TRP beam (e.g., TB#1) and received by the UE using the first UE beam (e.g., UB#1) is obtained.

In step 506, a determination is made as to whether the first parameter is not less than T.

In step 508, as a result of determining that the first parameter is not less than T, the first TRP beam (e.g., TB#1) is added to the first group of TRP beams.

In step 510, a second parameter indicating a received signal strength of a reference signal transmitted by TRP 106 over the first TRP beam (e.g., TB#1) and received by the UE using the second UE beam (e.g., UB#2) is obtained.

In step 512, a determination is made as to whether the second parameter is not less than T.

In step 514, as a result of determining that the second parameter is not less than T, the first TRP beam (e.g., TB#1) is added to the second group of TRP beams. As a result of performing process 500, the first TRP beam (e.g., TB#1) is included in both the first group of TRP beams and the second group of TRP beams.

The above procedure is repeated for the other TRP beams (e.g., TB#2, TB#3 and TB#4). After the procedure is repeated for these other TRP beams zero or more of these other TRP beams may be added to the first group of TRP beams and zero or more of these other TRP beams may be also added to the second group of TRP beams. In this way, each of the first group of TRP beams and the second group of TRP beams will include the "good enough" TRP beams, as opposed to including only the "best" TRP beams.

In some embodiments, the method is performed by the first UE, and the process may further include the UE receiving the reference signal. In such an embodiment, the step of obtaining the first parameter indicating the received signal strength of the reference signal comprises the UE detecting the signal strength of the received reference signal. The process may further include the UE transmitting to the TRP beam grouping information comprising information indicating that the first TRP beam is included in the first group of TRP beams and information indicating that the first TRP beam is included in the second group of TRP beams.

In some embodiments, the process is performed by TRP 106. In such embodiments, the process may further include TRP 106 transmitting, in a first slot, a reference signal using TB#1, and transmitting, in a second slot, a reference signal using TB#1, so that UE 102 may evaluate BPL#1 (i.e., TB#1 combined with UB#1) and BPL#2 (i.e., TB#1 combined with UB#2). That is, during the first slot, UE 102 uses UB#1 to receive and measure the received power of the reference signal transmitted using TB#1, and during the second slot, UE 102 uses UB#2 to receive and measure the received power of the reference signal transmitted using TB#1. This process is repeated for the other TRP beams so that UE 102 can evaluate each BPL and group the TRP beams based on the results of the evaluations.

The process may further include TRP 106 receiving the beam grouping information, and, when the UE is employing the first UE beam, TRP 106 making a data transmission scheduling decision for the UE using the received beam grouping information. In some embodiments, making the data transmission scheduling decision for the UE using the received beam grouping information comprises determining whether to schedule a data transmission to the UE during a first time slot, wherein the determination is based on whether the beam grouping information indicates that a second TRP beam is included in the first group of TRP beams.

Figure 6:
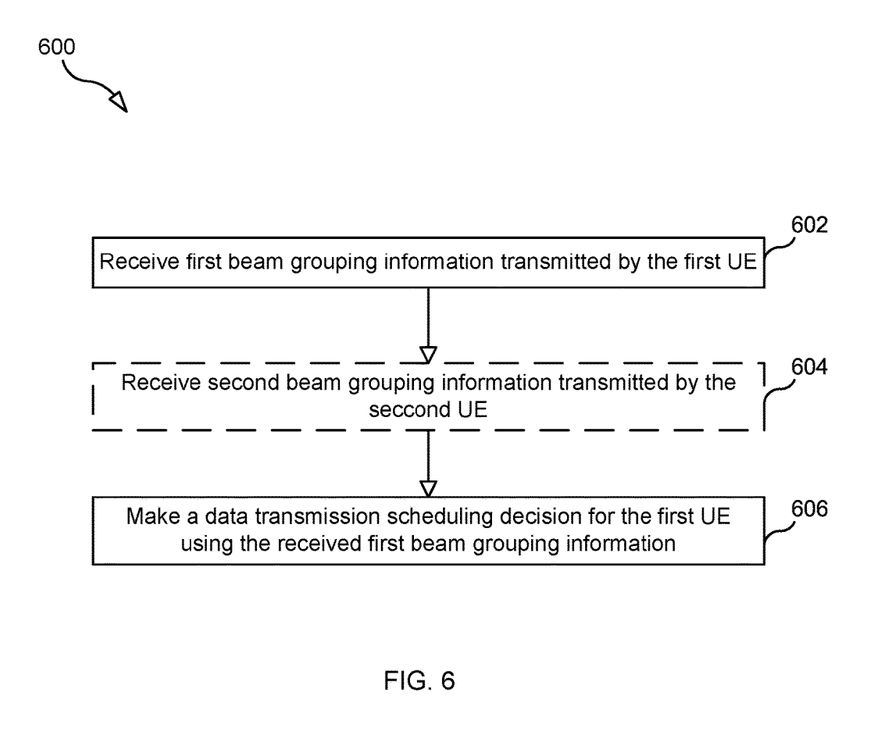
FIG. 6 is a flow chart illustrating a process according to one embodiment.

FIG. 6 is a flow chart illustrating, according to some embodiments, a process 600 for scheduling a data transmission to a first UE (e.g., UE 102).

Process 600 may begin with step 602, in which TRP 106 receives first beam grouping information transmitted by the first UE. The first beam grouping information includes: a) information indicating that a first TRP beam is included in a first group of TRP beams for use in communicating with the first UE when the first UE is employing a first UE beam and b) information indicating that the first TRP beam is included in a second group of TRP beams for use in communicating with the first UE when the first UE is employing a second UE beam.

Process 600 may also include an optional step 604 of TRP 106 receiving second beam grouping information transmitted by a second UE (e.g., UE 104), where the second beam grouping information includes information indicating that the second TRP beam is included in a third group of TRP beams for use in communicating with the second UE when the second UE is employing a third UE beam. Process 600 further includes step 606, in which TRP 106 makes a data transmission scheduling decision for the first UE using the first beam grouping information.

In some embodiments, the process further includes TRP 106 determining that the first UE is configured such that the first UE employs the first UE beam during a first time slot. In such an embodiments, making the data transmission scheduling decision for the first UE using the first beam grouping information comprises determining whether to schedule a data transmission to the first UE during the first time slot, wherein the determination is based on whether the first beam grouping information indicates that a second TRP beam is included in the first group of TRP beams for use in communicating with the first UE when the first UE is employing the first UE beam.

In some embodiments, the process further includes TRP 106 determining that a second UE is configured such that the second UE employs the third UE beam during the first time slot; and TRP 106 selects the second TRP beam for use in transmitting data to the second UE during the first time slot. In such an embodiment, TRP 106 makes the data transmission scheduling decision for the first UE after selecting to use the second TRP beam to transmit the data to the second UE.

In some embodiments, the process further includes: TRP 106 scheduling a transmission of data to a third UE over a third TRP beam during a second time slot; TRP 106 determining that the first UE is configured such that the first UE employs the second UE beam during the second time slot; and TRP 106 making a second data transmission scheduling decision for the first UE using the first beam grouping information, wherein making the second data transmission scheduling decision for the UE using the first beam grouping information comprises determining whether to schedule a data transmission to the first UE during the second time slot, wherein the determination is based on whether the first beam grouping information indicates that the third TRP beam is included in the second group of TRP beams for use in communicating with the first UE when the first UE is employing the second UE beam.

Figure 7:
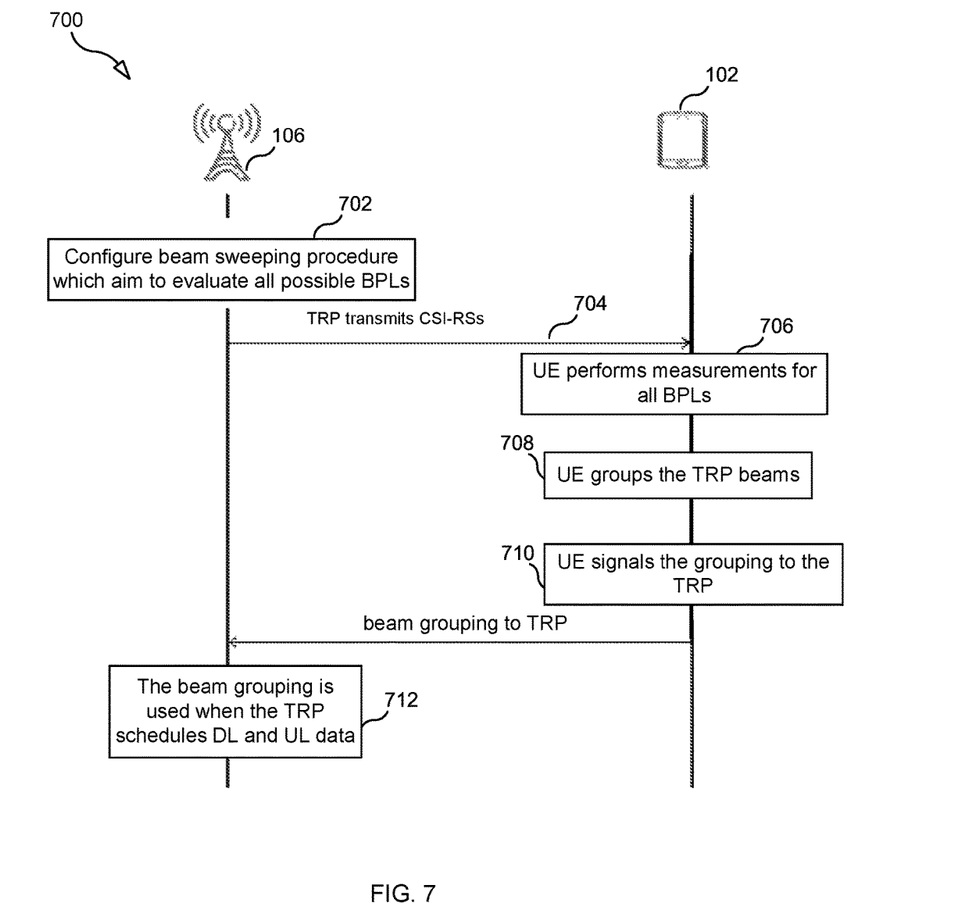
FIG. 7 is a flow chart illustrating a process according to one embodiment.

FIG. 7 illustrates a process according to some embodiments for forming, for UE 102, a plurality of TRP beam groups. In the first step (step 702), TRP 106 configures a beam sweeping procedure that aims to evaluate all combinations of TRP beams and UE beams (i.e., all possible beam pair links (BPLs)). However, in case TRP 106 has prior information of where UE 102 might be located, only a subset of the set of all possible BPLs might need to be evaluated. The beam sweeping procedure can be either periodic and shared between all UEs served by TRP 106 or it can be aperiodic and UE-specific. This step may include TRP 106 providing a command to UE 102 to perform the necessary RSRP measurements.

In the next step (step 704), TRP 106 transmits the CSI-RSs in different TRP beams, and repeats the transmission for each TRP beam such that UE 102 can measure RSRP for all different combinations of TRP beams and UE beams.

In step 706, UE 102 performs measurements for each of the BPLs. For example, UE 102 first uses UB#1 to receive the RSs transmitted using TB#1-TB#4 and measure the received signal power, and then UE 102 uses UB#2 to receive the RSs transmitted using TB#1-TB#4 and measure the received signal power. Thus, in step 702, TRP 106 transmits an RS on each of TB#1-TB#4 twice—i.e., at a first point in time and at a second point in time so that UE 102 can evaluate each BPL.

In the next step (step 708), UE 102 groups the TRP beams such that the TRP beams that are received with an RSRP above a certain threshold for a given UE beam ends up in the same group (i.e., UE 102 performs the "good enough TRP beam" strategy to form the TRP beam groups).

In the next step (step 710), UE 102 signals the TRP beam grouping information (and typically the RSRP for each BPL (TRP beam/UE beam combination)) to the TRP. In step 712, TRP 106 uses the beam grouping information to facilitate scheduling for all UEs served by TRP 106.

Figure 8:
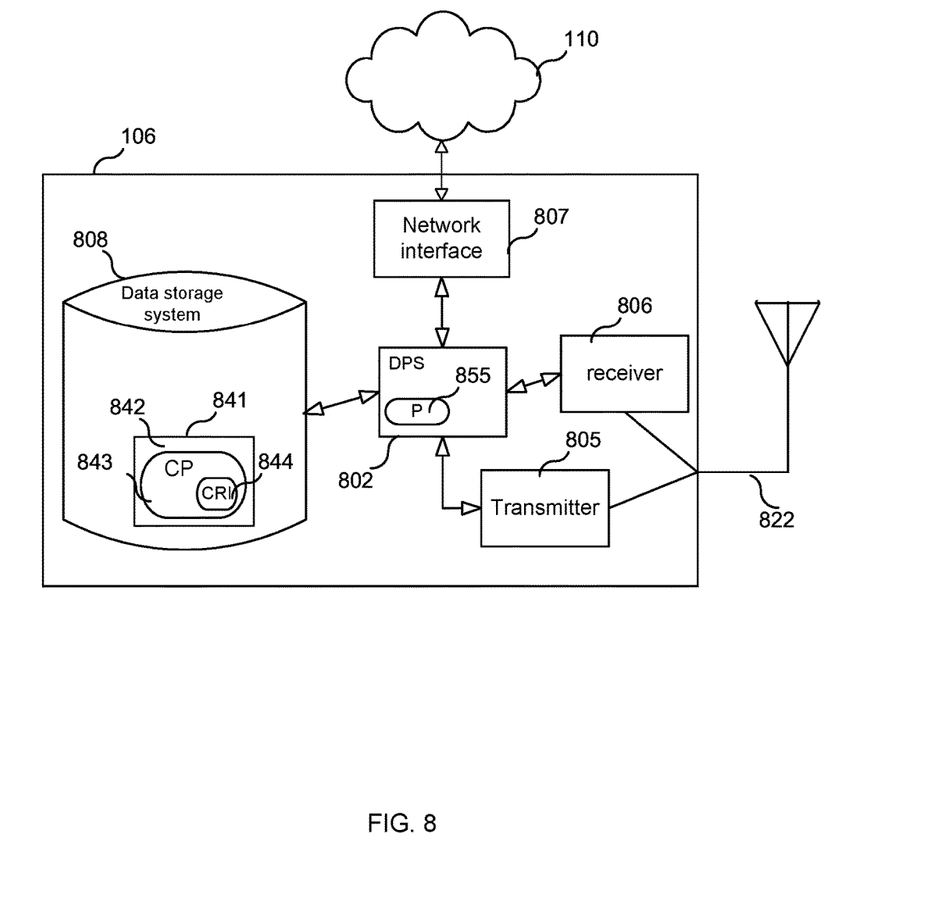
FIG. 8 is a block diagram of a TRP according to some embodiments.

FIG. 8 is a block diagram of TRP 106 according to some embodiments. As shown in FIG. 8, TRP 106 may comprise: a data processing system (DPS) 802, which may include one or more processors 855 (e.g., a general purpose microprocessor and/or one or more other processors, such as an application specific integrated circuit (ASIC), field-programmable gate arrays (FPGAs), and the like); a radio transmitter 805 and a radio receiver 806 coupled to an antenna 822 for use in wirelessly communicating with a UE; a network interface 807 for use in connecting TRP 106 to a network 110 (e.g., an IP network); and local storage unit (a.k.a., "data storage system") 812, which may include one or more non-volatile storage devices and/or one or more volatile storage devices (e.g., random access memory (RAM)). In embodiments where TRP 106 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media (e.g., a DVD), memory devices (e.g., random access memory, flash memory), and the like. In some embodiments, the CRI 844 of computer program 843 is configured such that when executed by data processing system 802, the CRI causes TRP 106 to perform steps described above (e.g., steps described above with reference to the flow charts). In other embodiments, TRP 106 may be configured to perform steps described herein without the need for code. That is, for example, data processing system 802 may consist merely of one or more ASICs. Hence, the features of the embodiments described herein may be implemented in hardware and/or software.

Figure 9:
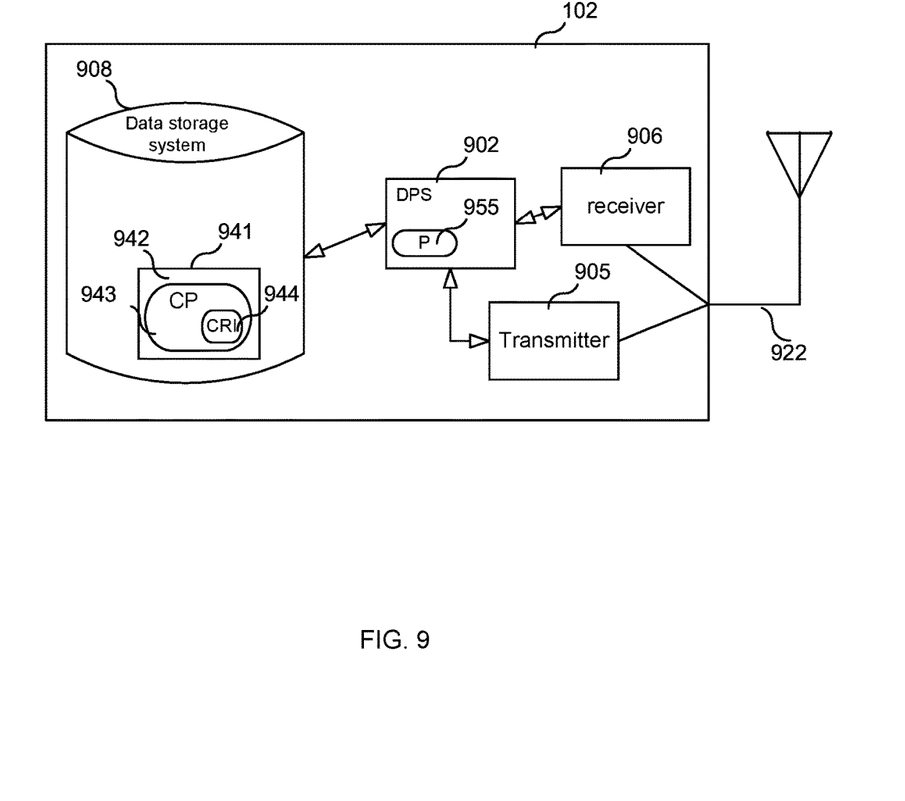
FIG. 9 is a block diagram of a UE according to some embodiments.

FIG. 9 is a block diagram of a UE 102 according to some embodiments. As shown in FIG. 9, UE 102 may comprise: a data processing system (DPS) 902, which may include one or more processors 955 (e.g., a general purpose microprocessor and/or one or more other processors, such as an application specific integrated circuit (ASIC), field-programmable gate arrays (FPGAs), and the like); a radio transmitter 905 and a radio receiver 906 coupled to an antenna 922 for use in wirelessly communicating with a radio access network (RAN) node (e.g., a TRP); and local storage unit (a.k.a., "data storage system") 912, which may include one or more non-volatile storage devices and/or one or more volatile storage devices (e.g., random access memory (RAM)). In embodiments where UE 102 includes a general purpose microprocessor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media (e.g., a DVD), memory devices (e.g., random access memory, flash memory), and the like. In some embodiments, the CRI 944 of computer program 943 is configured such that when executed by data processing system 902, the CRI causes UE 102 to perform steps described above (e.g., steps described above with reference to the flow charts). In other embodiments, UE 102 may be configured to perform steps described herein without the need for code. That is, for example, data processing system 902 may consist merely of one or more ASICs. Hence, the features of the embodiments described herein may be implemented in hardware and/or software.

Figure 10:
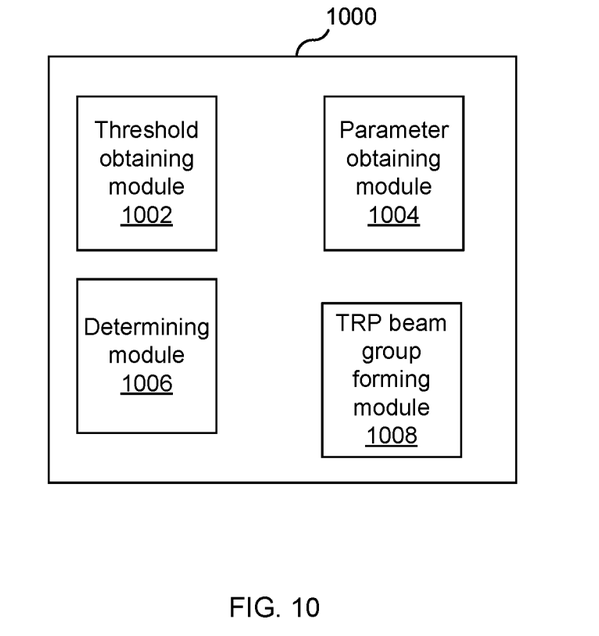
FIG. 10 is a diagram showing functional modules of an apparatus (e.g., UE or TRP) according to some embodiments.

FIG. 10 is a diagram showing functional modules of an apparatus 1000 (e.g., UE or TRP) according to some embodiments. As shown in FIG. 10 apparatus 1000 includes: a threshold obtaining module 1002 for obtaining a received signal power threshold value, T; a parameter obtaining module 1004 for obtaining: i) a first parameter indicating a received signal strength of a reference signal transmitted by a TRP over a first TRP beam and received by the UE using the first UE beam and ii) a second parameter indicating a received signal strength of a reference signal transmitted by the TRP over the first TRP beam and received by the UE using the second UE beam; a determining module 1006 for determining: i) whether the first parameter is not less than T and ii) whether the second parameter is not less than T; and a TRP beam group forming module 1008 for i) adding the first TRP beam to the first group of TRP beams as a result of determining that the first parameter is not less than T and ii) adding the first TRP beam to the second group of TRP beams as a result of determining that the second parameter is not less than T, such that the first TRP beam is included in both the first group of TRP beams and the second group of TRP beams.

Figure 11:
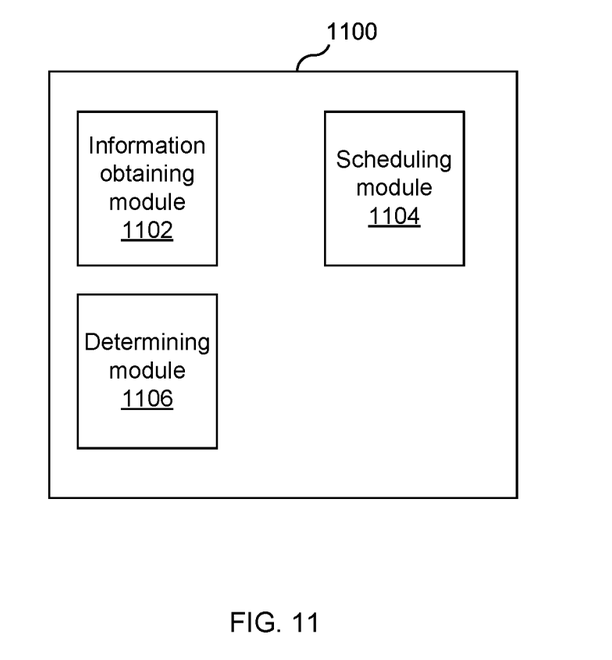
FIG. 11 is a diagram showing functional modules of a TRP according to some embodiments.

FIG. 11 is a diagram showing functional modules of TRP 1100 (e.g., TRP 106) according to some embodiments. As shown in FIG. 11, TRP 1100 includes: an information obtaining module 1102 for obtaining first beam grouping information transmitted by the first UE, the first beam grouping information comprising: a) information indicating that a first transmit point, TRP, beam is included in a first group of TRP beams for use in communicating with the first UE when the first UE is employing a first UE beam and b) information indicating that the first TRP beam is included in a second group of TRP beams for use in communicating with the first UE when the first UE is employing a second UE beam; and a scheduling module 1104 for making a data transmission scheduling decision for the first UE using the received first beam grouping information While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for forming at least i) a first of group of transmit point (TRP) beams for use in communicating with a user equipment (UE), when the UE is employing a first UE beam and ii) a second group of TRP beams for use in communicating with the UE when the UE is employing a second UE beam, the method comprising:
obtaining a received signal power threshold value, T;
obtaining a first parameter indicating a received signal strength of a reference signal transmitted by a TRP over a first TRP beam and received by the UE using the first UE beam;
determining whether the first parameter is not less than T;
as a result of determining that the first parameter is not less than T, adding the first TRP beam to the first group of TRP beams;
obtaining a second parameter indicating a received signal strength of a reference signal transmitted by the TRP over the first TRP beam and received by the UE using the second UE beam;
determining whether the second parameter is not less than T; and
as a result of determining that the second parameter is not less than T, adding the first TRP beam to the second group of TRP beams such that the first TRP beam is included in both the first group of TRP beams and the second group of TRP beams.

2. The method of claim 1, wherein obtaining the received signal power threshold value comprises receiving a message transmitted by the TRP, wherein the message comprises the received signal power threshold value.

3. The method of claim 1, wherein
the method further comprises the UE receiving the reference signal, and
obtaining the first parameter indicating the received signal strength of the reference signal comprises the UE detecting the signal strength of the received reference signal.

4. The method of claim 1, wherein
the method is performed by the first UE, and
the method further comprises the UE transmitting to the TRP beam grouping information comprising information indicating that the first TRP beam is included in the first group of TRP beams and information indicating that the first TRP beam is included in the second group of TRP beams.

5. The method of claim 1, further comprising:
the TRP receiving beam grouping information transmitted by the UE, wherein the beam grouping information comprises information indicating that the first TRP beam is included in the first group of TRP beams and information indicating that the first TRP beam is included in the second group of TRP beams, and
the TRP making a data transmission scheduling decision for the UE using the received beam grouping information.

6. The method of claim 5, wherein making the data transmission scheduling decision for the UE using the received beam grouping information comprises determining whether to schedule a data transmission to the UE, wherein the determination is based on whether the beam grouping information indicates that a second TRP beam is included in the first group of TRP beams.

7. An apparatus for forming at least i) a first group of transmit point (TRP) beams for use in communicating with a first user equipment (UE), when the UE is employing a first UE beam and ii) a second group of TRP beams for use in communicating with the UE when the UE is employing a second UE beam, the apparatus being configured to:
obtain a signal power threshold value, T;
obtain a first parameter indicating a received signal strength of a reference signal transmitted by a TRP over a first TRP beam and received by the UE using the first UE beam;
determine whether the first parameter is not less than T;
as a result of determining that the first parameter is not less than T, add the first TRP beam to the first group of TRP beams;
obtain a second parameter indicating a received signal strength of a reference signal transmitted by the TRP over the first TRP beam and received by the UE using the second UE beam;
determine whether the second parameter is not less than T; and
as a result of determining that the second parameter is not less than T, add the first TRP beam to the second group of TRP beams such that the first TRP beam is included in both the first group of TRP beams and the second group of TRP beams.

8. The apparatus of claim 7, wherein
the apparatus is the UE, and
the UE obtains the received signal power threshold value by performing a process comprising receiving a message transmitted by the TRP, wherein the message comprises the received signal power threshold value.

9. The apparatus of claim 7, wherein
the apparatus is the UE, and
the UE is further adapted to receive the reference signal, and
the UE obtains the first parameter indicating the received signal strength of the reference signal by performing a process comprising detecting the signal strength of the received reference signal.

10. The apparatus of claim 7, wherein
the apparatus is the UE, and
the UE is further adapted to transmit to the TRP beam grouping information comprising information indicating that the first TRP beam is included in the first group of TRP beams and information indicating that the first TRP beam is included in the second group of TRP beams.

11. The apparatus of claim 7, wherein
the apparatus is the TRP,
the TRP is further adapted to obtain beam grouping information comprising information indicating that the first TRP beam is included in the first group of TRP beams and information indicating that the first TRP beam is included in the second group of TRP beams, and
the TRP is further adapted such that the TRP makes a data transmission scheduling decision for the UE using the received beam grouping information.

12. The apparatus of claim 11, wherein the TRP is adapted to make the data transmission scheduling decision for the UE using the received beam grouping information by performing a process comprising determining whether to schedule a data transmission to the UE, wherein the determination is based on whether the received beam grouping information indicates that a second TRP beam is included in the first group of TRP beams.

13. A method for scheduling a data transmission to a first user equipment (UE), the method comprising:
a transmission point (TRP) receiving first beam grouping information transmitted by the first UE, the first beam grouping information comprising: a) information indicating that a first transmit point (TRP) beam is included in a first group of TRP beams for use in communicating with the first UE when the first UE is employing a first UE beam and b) information indicating that the first TRP beam is included in a second group of TRP beams for use in communicating with the first UE when the first UE is employing a second UE beam;
the TRP making a data transmission scheduling decision for the first UE using the received first beam grouping information; and
the TRP determining that the first UE is configured such that the first UE employs the first UE beam during a first time slot, wherein
making the data transmission scheduling decision for the first UE using the first beam grouping information comprises determining whether to schedule a data transmission to the first UE during the first time slot, and
the determination is based on whether the first beam grouping information indicates that a second TRP beam is included in the first group of TRP beams for use in communicating with the first UE when the first UE is employing the first UE beam.

14. The method of claim 13, further comprising:
the TRP receiving second beam grouping information transmitted by a second UE, the second beam grouping information comprising information indicating that the second TRP beam is included in a third group of TRP beams for use in communicating with the second UE when the second UE is employing a third UE beam;
the TRP determining that the second UE is configured such that the second UE employs the third UE beam during the first time slot; and
the TRP selecting the second TRP beam for use in transmitting data to the second UE during the first time slot, wherein
the TRP makes the data transmission scheduling decision for the first UE after selecting to use the second TRP beam to transmit the data to the second UE.

15. The method of claim 13, further comprising:
the TRP scheduling a transmission of data to a third UE over a third TRP beam during a second time slot; the TRP determining that the first UE is configured such that the first UE employs the second UE beam during the second time slot; and
the TRP making a second data transmission scheduling decision for the first UE using the first beam grouping information, wherein
making the second data transmission scheduling decision for the first UE using the first beam grouping information comprises determining whether to schedule a data transmission to the first UE during the second time slot, wherein the determination is based on whether the first beam grouping information indicates that the third TRP beam is included in the second group of TRP beams for use in communicating with the first UE when the first UE is employing the second UE beam.

16. A TRP for scheduling a data transmission to a first user equipment (UE), the TRP being adapted to:
obtain first beam grouping information transmitted by the first UE, the first beam grouping information comprising: a) information indicating that a first transmit point (TRP) beam is included in a first group of TRP beams for use in communicating with the first UE when the first UE is employing a first UE beam and b) information indicating that the first TRP beam is included in a second group of TRP beams for use in communicating with the first UE when the first UE is employing a second UE beam; and
make a data transmission scheduling decision for the first UE using the received first beam grouping information, wherein
the TRP is further adapted to determine that the first UE is configured such that the first UE employs the first UE beam during a first time slot,
the TRP is configured to make the data transmission scheduling decision for the first UE using the first beam grouping information by performing a process comprising determining whether to schedule a data transmission to the first UE during the first time slot, and
the determination is based on whether the first beam grouping information indicates that a second TRP beam is included in the first group of TRP beams for use in communicating with the first UE when the first UE is employing the first UE beam.

17. The TRP of claim 16, wherein the TRP is further adapted to:
obtain second beam grouping information transmitted by a second UE, the second beam grouping information comprising information indicating that the second TRP beam is included in a third group of TRP beams for use in communicating with the second UE when the second UE is employing a third UE beam;
determine that the second UE is configured such that the second UE employs the third UE beam during the first time slot; and
select the second TRP beam for use in transmitting data to the second UE during the first time slot, wherein
the TRP makes the data transmission scheduling decision for the first UE after selecting to use the second TRP beam to transmit the data to the second UE.

18. The TRP of claim 16, wherein the TRP is further adapted to:
schedule a transmission of data to a third UE over a third TRP beam during a second time slot;
determine that the first UE is configured such that the first UE employs the second UE beam during the second time slot; and
make a second data transmission scheduling decision for the first UE using the first beam grouping information, wherein
the TRP is configured to make the second data transmission scheduling decision for the first UE using the first beam grouping information by performing a process comprising determining whether to schedule a data transmission to the first UE during the second time slot, wherein the determination is based on whether the first beam grouping information indicates that the third TRP beam is included in the second group of TRP beams for use in communicating with the first UE when the first UE is employing the second UE beam.

* * * * *